M. COLE.
ELECTRIC TRAP.
APPLICATION FILED MAR. 14, 1911.

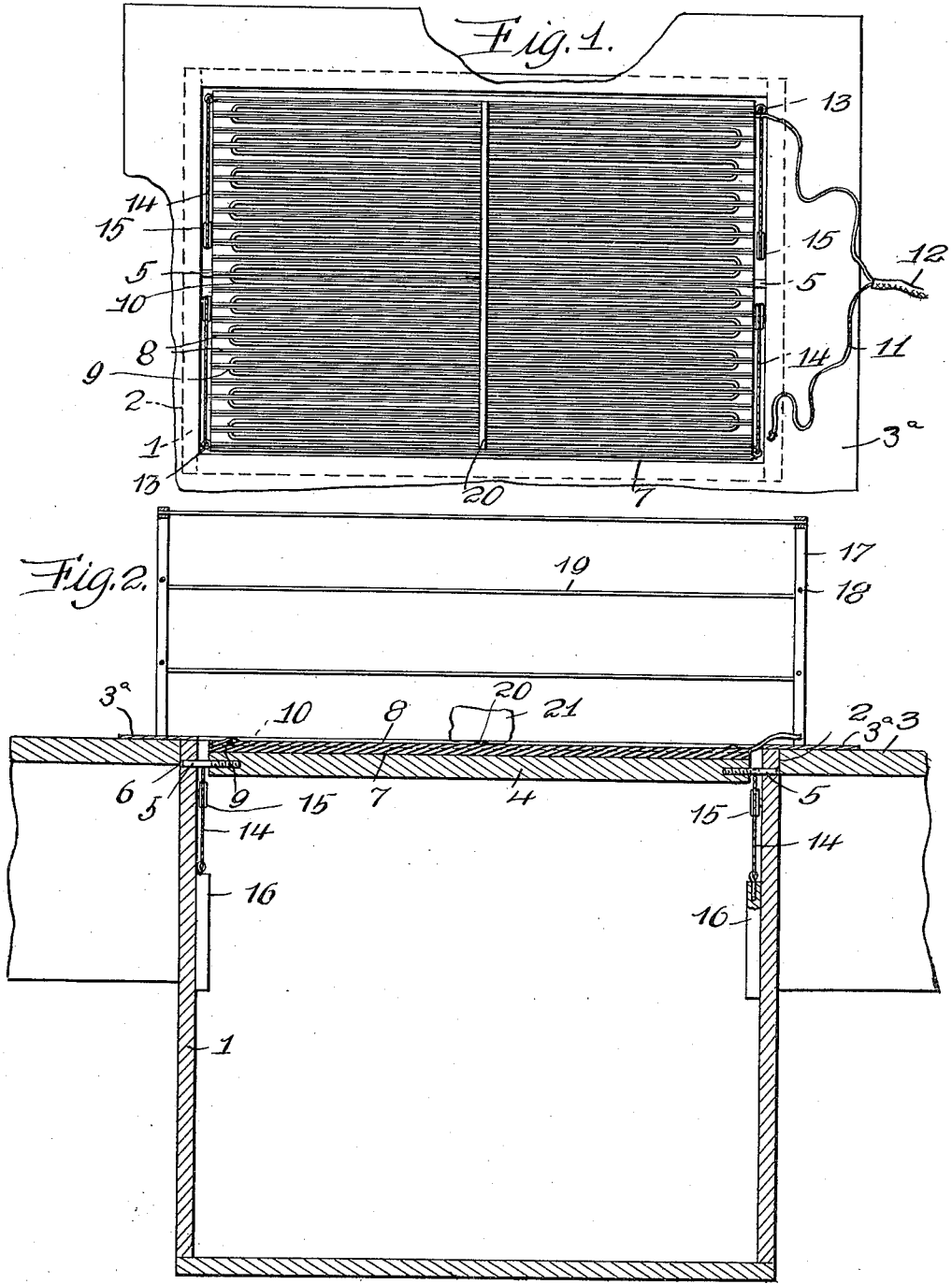

1,006,910.

Patented Oct. 24, 1911.

2 SHEETS—SHEET 2.

WITNESSES:

INVENTOR.
M. Cole.
BY
ATTORNEYS.

UNITED STATES PATENT OFFICE.

MALCOLM COLE, OF McKEES ROCKS, PENNSYLVANIA.

ELECTRIC TRAP.

1,006,910.  Specification of Letters Patent.  Patented Oct. 24, 1911.

Application filed March 14, 1911. Serial No. 614,433.

*To all whom it may concern:*

Be it known that I, MALCOLM COLE, a citizen of the United States of America, residing at McKees Rocks, in the county of Allegheny and State of Pennsylvania, have invented certain new and useful Improvements in Electric Traps, of which the following is a specification, reference being had therein to the accompanying drawing.

This invention relates to electric traps particularly designed for the extermination of rodents by the use of electricity.

The primary object of the invention is to utilize an electric current for shocking and exterminating rats and other rodents in a manner that is safe to the public and animals, as cats and dogs in the vicinity of the trap.

Another object of this invention is to dispose of the bodies of rats and other rodents after they have been shocked or electrocuted, whereby the trap will be immediately in condition for shocking or electrocuting other rats.

A further object of this invention is to provide an electrical trap that can be safely used without causing a fire, the trap being simple in construction, durable and highly efficient for the purposes for which it is intended.

With the above and other objects in view, the invention resides in the novel construction, combination and arrangement of parts to be hereinafter specifically described and then claimed.

Reference will now be had to the drawings forming part of this specification, wherein like numerals of reference designate corresponding parts throughout the several views, in which:—

Figure 3:
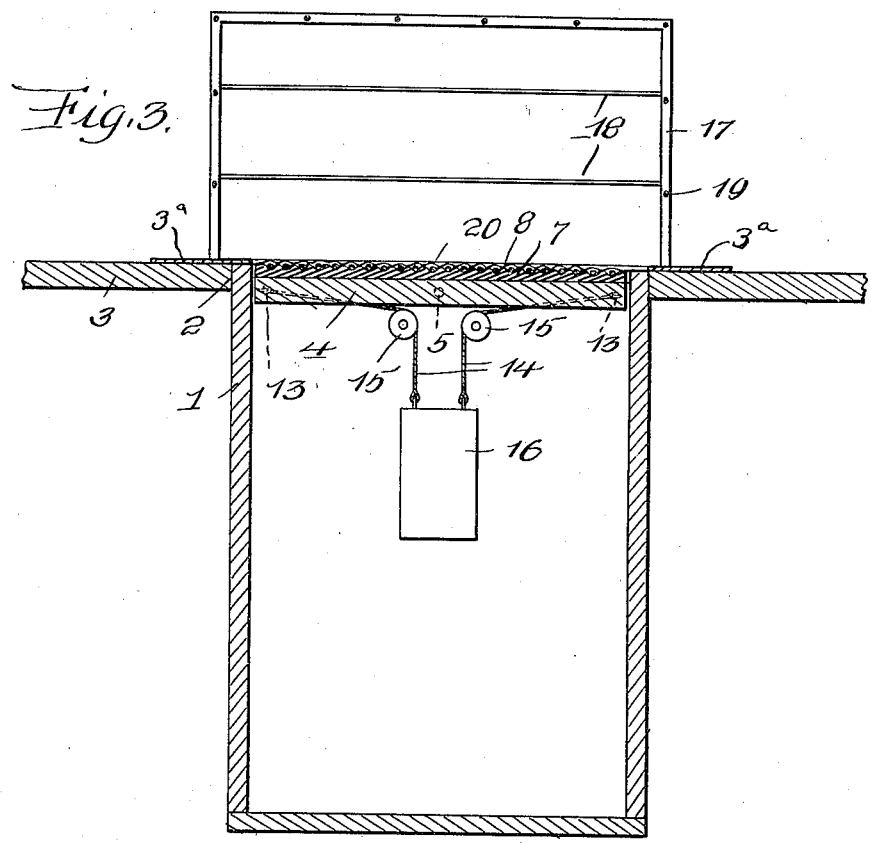
Figure 4:
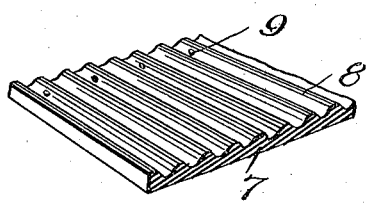

Figure 1 is a plan of the trap, Fig. 2 is a longitudinal sectional view of the same, Fig. 3 is a cross sectional view of the same, and Fig. 4 is a perspective view of a portion of the trap.

The reference numeral 1 denotes a well, pit or suitable receptacle in which a liquid can be placed or it can be used in an empty condition. It is preferable to suspend this receptacle in an opening 2 provided therefor in a floor 3 with the upper edges of the receptacle flush with the top of the floor. Surrounding the opening in the floor is a metallic plate 3ª.

Trunnioned longitudinally in the upper end of the receptacle 1 is a suitable lid or platform 4 rectangular in plan and having the ends thereof provided with central trunnions 5 extending into openings 6 provided therefor in the end walls of the receptacle 1. The lid or platform 4 is removed from the upper edges of the receptacle 1 and mounted upon said lid or platform is a plate of insulation 7 having the upper surface thereof longitudinally corrugated, as at 8 with the corrugations adjacent to the ends thereof provided with transverse openings 9, through which the wire is successively led, the exposed portion of the wire extending within the corrugations. This wire leads from a suitable source of current supply and terminates on the lid or platform 4, the terminal having no return connection. The other wire 11 for the circuit is connected to the plate 3ª, thereby not only providing a normally broken circuit between the plate and the wire 10, but providing a gap between the lid or platform and the plate 3ª to eliminate all possibility of the circuit being accidentally completed by movements of the lid or platform. The wires may be covered as at 12.

In operation, a rat or other rodent forms the bridge to complete the circuit the instant the animal has simultaneously contacted with the plate 3ª and any of the convolutions of the wire 10, resulting in the electrocution of the animal.

The ends of the lid or platform 4, adjacent to the longitudinal edges thereof, are provided with staples 13 and connected to said staples are cables 14 passing over sheaves 15, revolubly supported by the inner sides of the end walls of the receptacles 1. The ends of the cables 14 are attached to weights 16, said weights normally maintaining the lid or platform in a horizontal plane, but the weight of the rat or mouse upon the lid or platform is sufficient to tilt the same whereby the rat or mouse will roll off of the lid or platform into the receptacle.

To prevent cats, dogs and other animals and even persons from contacting with the charged coil of wire, a cage is arranged above the receptacle, said cage comprising side frames 17 having equally spaced longitudinal rods 18, said frames being connected by transverse rods 19.

As an inducement for rats or other rodents to pass on to the tiltable lid or platform 4, said lid or platform has the insulated plate 7 thereof provided with a transverse strip 20 and to this strip is secured a bait 21.

It is thought that the operation and utility of the trap will be apparent without further description, and while in the drawings there is illustrated one embodiment of the invention, it is to be understood that the structural elements thereof are susceptible to such changes as fall within the scope of the appended claims.

What I claim is:—

1. In an electric trap, the combination with a floor having an opening, of a receptacle suspended in said opening with the upper edges thereof flush with said floor, a tiltable lid trunnioned in the upper end of said receptacle, a plate of insulation carried by said lid, a coiled wire arranged upon said lid and connected with a suitable source of electrical energy, a plate at the periphery of the floor opening and also connected to the source of electrical energy, said plate and wire normally forming a broken circuit which is completed by the animal being electrocuted and a cage supported by said floor above said lid.

2. In an electric trap, a receptacle, a lid trunnioned in the upper end of said receptacle, a plate of insulation carried by said lid, a coil of wire mounted upon said plate of insulation, a plate annular with respect to the receptacle, said plate and wire forming part of a normally-broken electric circuit, and a cage mounted above said receptacle.

3. In an electric trap, a receptacle, a tiltable lid trunnioned in the upper end of said receptacle, means connected to said lid and arranged within said receptacle and adapted to normally maintain said lid in a horizontal position, a wire carried by the top of said lid, a plate annular with respect to the receptacle, said plate and wire forming a part of a normally-broken electric circuit.

4. In an electric trap, a receptacle, a tiltable lid trunnioned in the upper end of said receptacle and adapted to normally close said receptacle, a corrugated plate of insulation carried by said lid, a coil of wire arranged in the corrugations of said plate, a plate annular with respect to the receptacle, said plate and wire forming part of a normally-broken electric circuit, and a cage erected above said lid, substantially as described.

5. In an electric trap, the combination with a floor having an opening formed therein, of a receptacle suspended in said opening, a tiltable lid trunnioned in the upper end of said receptacle, a corrugated plate of insulation carried by said lid, a coil of wire arranged in the corrugations of said plate, a plate annular with respect to the receptacle, said plate and wire forming part of a normally-broken electric circuit, a bait holder carried by said lid, a cage supported by said floor above said receptacle, and means arranged in said receptacle and adapted to normally hold said lid in a horizontal position.

6. In an electric trap, a receptacle, a lid trunnioned in the upper end of said receptacle, a coil of wire carried by said lid and connected to a source of electrical supply, a stationary electrode located without the path of movement of the lid, also connected to said source of supply and forming with said coil of wire a normally broken circuit, said electrode being located in the path of travel of a rodent onto said lid, the contact of the rodent with the electrode and the lid wire completing the circuit through the body of the rodent.

In testimony whereof I affix my signature in the presence of two witnesses.

MALCOLM COLE.

Witnesses:
Max H. Srolovitz,
Chas. E. Gettys.

---

Copies of this patent may be obtained for five cents each, by addressing the "Commissioner of Patents, Washington, D. C."